United States Patent
Abeel et al.

(10) Patent No.: US 10,742,308 B2
(45) Date of Patent: *Aug. 11, 2020

(54) AVIATION DATALINK COMMUNICATIONS MANAGEMENT UNIT

(71) Applicant: Spectralux Corporation, Redmond, WA (US)

(72) Inventors: Ronald Abeel, Sultan, WA (US); Steinarr Bragason, Hafnarfjordur (IS); Tony Monroe Bragg, Everett, WA (US); Douglas W. Daman, Poulsbo, WA (US); Brian DeHart, Kenmore, WA (US); James Dooley, Bothell, WA (US); Justin Grimes, Kenmore, WA (US); David E. Hiney, Woodinville, WA (US); Timothy Hong, Bothell, WA (US); Drew Johnson, Bellevue, WA (US); Paul Newby, Lynnwood, WA (US); James A. Reynolds, Bothell, WA (US); Bryan L. Sammons, Bothell, WA (US); Thomas Ogle Shafer, Seattle, WA (US); Frank E. Hummel, Woodinville, WA (US); Andy R. Hill, Basingstroke (GB)

(73) Assignee: SPECTRALUX CORPORATION, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/364,052

(22) Filed: Mar. 25, 2019

(65) Prior Publication Data

US 2019/0222298 A1   Jul. 18, 2019

Related U.S. Application Data

(63) Continuation-in-part of application No. 15/402,922, filed on Jan. 10, 2017, now Pat. No. 10,261,598.
(Continued)

(51) Int. Cl.
| | | |
|---|---|---|
| H04B 7/185 | (2006.01) |
| G08G 5/00 | (2006.01) |
| H04B 1/401 | (2015.01) |

(52) U.S. Cl.
CPC ....... *H04B 7/18506* (2013.01); *G08G 5/0013* (2013.01); *G08G 5/0021* (2013.01); *H04B 1/401* (2013.01)

(58) Field of Classification Search
CPC .. H04B 7/18506; H04B 1/401; G08G 5/0013; G08G 5/0021
(Continued)

(56) References Cited

U.S. PATENT DOCUMENTS

| | | |
|---|---|---|
| 5,517,561 A | 5/1996 | Redden |
| 5,809,402 A | 9/1998 | Lemme |

(Continued)

*Primary Examiner* — Fred Tzeng
(74) *Attorney, Agent, or Firm* — Davis Wright Tremaine LLP; George C. Rondeau, Jr.; Heather M. Colburn

(57) ABSTRACT

An interface device configured to interface with one or more aircraft avionics data systems and an antenna. The interface device includes a radio and at least one computing device that are housed inside an enclosure. The radio is connected to the antenna. The radio is configured to transmit outgoing messages and to receive incoming messages via the antenna. The at least one computing device is configured to send the outgoing messages to the radio for transmission by the radio via the antenna and to receive the incoming messages from the radio. The radio may be a very high frequency ("VHF") transceiver.

24 Claims, 8 Drawing Sheets

Related U.S. Application Data

(60) Provisional application No. 62/281,501, filed on Jan. 21, 2016, provisional application No. 62/652,184, filed on Apr. 3, 2018.

(58) Field of Classification Search
USPC .......................................................... 345/172
See application file for complete search history.

(56) References Cited

U.S. PATENT DOCUMENTS

| | | | |
|---|---|---|---|
| 5,920,807 A | 7/1999 | Lemme | |
| 6,175,314 B1 | 1/2001 | Cobley | |
| 6,862,651 B2 | 3/2005 | Beckert et al. | |
| 7,440,906 B1 | 10/2008 | Wetzer et al. | |
| 8,774,152 B2 * | 7/2014 | Han | H04L 5/0051 370/342 |
| 9,014,641 B2 | 4/2015 | Tamura | |
| 9,924,003 B2 | 3/2018 | Jun et al. | |
| 10,261,598 B2 * | 4/2019 | Bragason | G06F 3/0219 |
| 2002/0028662 A1 | 3/2002 | Yoshinaga | |
| 2003/0093187 A1 | 5/2003 | Walker | |
| 2004/0059497 A1 | 3/2004 | Sankrithi | |
| 2005/0156777 A1 | 7/2005 | King et al. | |
| 2005/0232167 A1 | 10/2005 | Gilbert et al. | |
| 2006/0265500 A1 * | 11/2006 | Trappeniers | A63F 13/12 709/225 |
| 2007/0288242 A1 | 12/2007 | Spengler et al. | |
| 2011/0035080 A1 | 2/2011 | Murphy | |
| 2011/0106345 A1 | 5/2011 | Takacs et al. | |
| 2011/0241896 A1 | 10/2011 | Camino | |
| 2013/0204487 A1 | 8/2013 | Ovens | |
| 2015/0161896 A1 | 6/2015 | Judy | |
| 2015/0251771 A1 | 9/2015 | Whitlow et al. | |
| 2016/0362093 A1 | 12/2016 | Gadzinski | |
| 2017/0039858 A1 | 2/2017 | Wang et al. | |

* cited by examiner

AVIATION DATALINK COMMUNICATIONS MANAGEMENT UNIT

CROSS REFERENCE TO RELATED APPLICATION(S)

This application is a continuation-in-part of U.S. patent application Ser. No. 15/402,922, filed on Jan. 10, 2017, which claims the benefit of U.S. Provisional Application No. 62/281,501, filed on Jan. 21, 2016. This application also claims the benefit of U.S. Provisional Application No. 62/652,184, filed on Apr. 3, 2018. Each of the three aforementioned applications is incorporated herein by reference in its entirety.

BACKGROUND OF THE INVENTION

Field of the Invention

The present invention is directed generally to aviation communication devices.

Description of the Related Art

Various designs exist for the layout of keys in a functional arrangement for aircraft avionics data input for systems such as but not limited to Aircraft Communications Addressing and Reporting System ("ACARS"), Controller-Pilot Data Link Communications ("CPDLC") system, Aeronautical Telecommunications Network ("ATN"), and Future Air Navigation Systems ("FANS"). It is desirable to increase the functionality of the key layouts used for aircraft avionics data input for various systems. The present application provides this and other advantages as will be apparent from the following detailed description and accompanying figures.

BRIEF DESCRIPTION OF THE SEVERAL VIEWS OF THE DRAWING(S)

Exemplary embodiments are illustrated in referenced figures. It is intended that the embodiments and figures disclosed herein are considered illustrative rather than restrictive.

Like reference numerals have been used in the figures to identify like components.

DETAILED DESCRIPTION OF THE INVENTION

Figure 1:
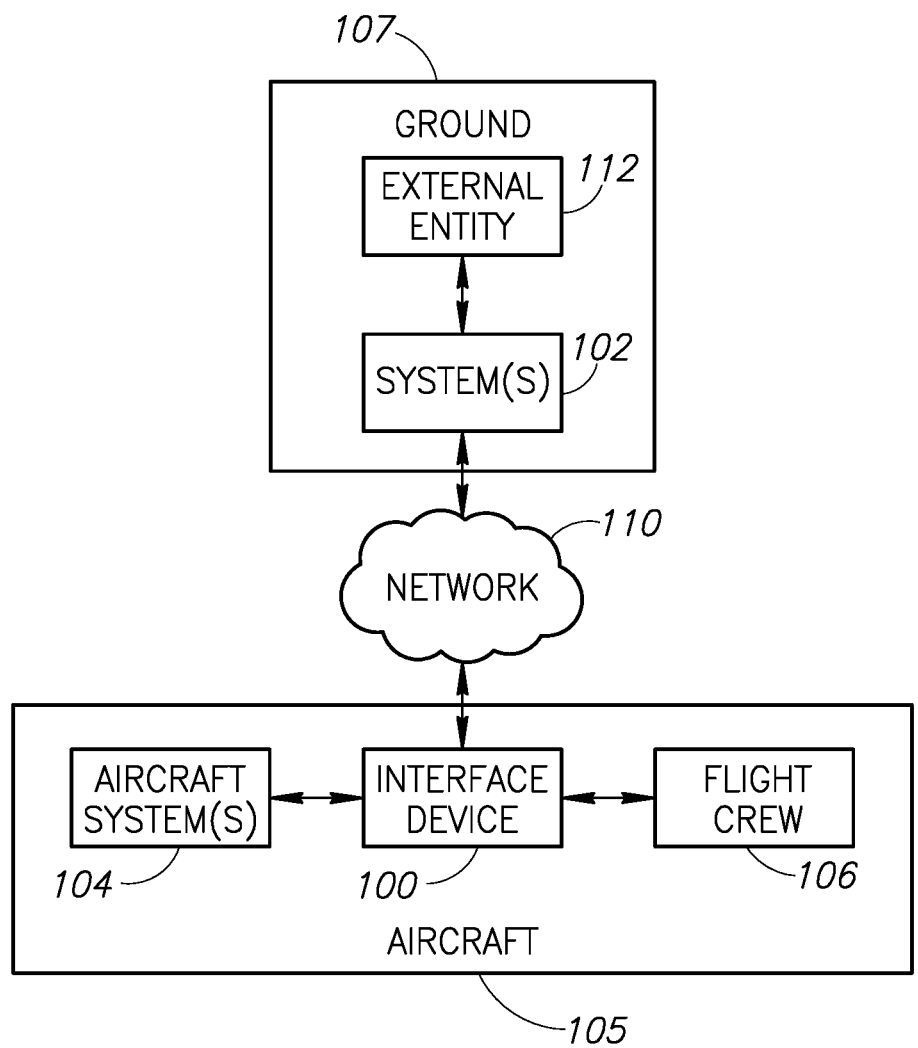
FIG. 1 is a block diagram of an avionics communication system including an interface device having functionally arranged keys.

FIG. 1 illustrates an avionics interface device 100 configured to interface with one or more aircraft avionics data systems 102 and 104. The interface device 100 may be located on an aircraft 105. The system(s) 102 and 104 may be located on the aircraft 105 and/or on the ground 107. In the embodiment illustrated, the system(s) 102 is/are located on the ground 107 and the system(s) 104 are located on the aircraft 105. By way of non-limiting examples, the system(s) 102 may include one or more of the following systems:

Aircraft Communications Addressing and Reporting System ("ACARS");

Controller-Pilot Data Link Communications ("CPDLC") system, which is also known as ATC Data Link ("ATC") system;

Aeronautical Telecommunications Network ("ATN"); and

Future Air Navigation Systems ("FANS").

A flight crew 106 may use the interface device 100 to send messages to and/or receive messages from the system(s) 102 over a network 110. By way of a non-limiting example, the network 110 may include one or more of a Very-High Frequency Digital Link ("VDL") Mode A network, a VDL Mode 2 network, a SATCOM network, and the like. The system(s) 102 may provide communication between the flight crew 106 and an external entity 112 (e.g., an air traffic controller, one or more air traffic service units, and the like).

The interface device 100 may operate in one or more different modes. For example, the interface device 100 may operate in a first mode (referred to as a "FANS 1/A CPDLC and ADS-C mode"), in which the network 110 may be implemented using the SATCOM network and the system(s) 102 may be implemented as the CPDLC system or Automatic Dependent Surveillance-Contract ("ADS-C") system. The CPDLC system enables two-way data link communication between the flight crew 106 and the external entity 112 (e.g., the air traffic controller). The ADS-C system supports sending flight information from the aircraft 105 to specific ground Air Traffic Service Units ("ATSUs").

The interface device 100 may operate in a second mode (referred to as an "ATN CPDLC mode"), in which the system(s) 102 may be implemented as the CPDLC system and the network 110 may be implemented as VDL Mode 2.

The interface device 100 may operate in a third mode (referred to as an "ACARS" mode), in which the system(s) 102 may be implemented as ACARS and the network 110 is implemented as VDL Mode A, VDL Mode 2 (AOA), and/or SATCOM.

The interface device 100 may be configured to work with an assortment of aircraft end system devices or aircraft systems (e.g., the system(s) 104), including a Flight Management Computer ("FMC"), and forward requests such as Winds Aloft or Flight Plan updates. These requests are transparently sent through the interface device 100 to the ground 107 when initiated from the FMC. The accompanying response messages from the ground 107 are routed by the interface device 100 back to the FMC (where the uplinked message and data is available).

Figure 2:
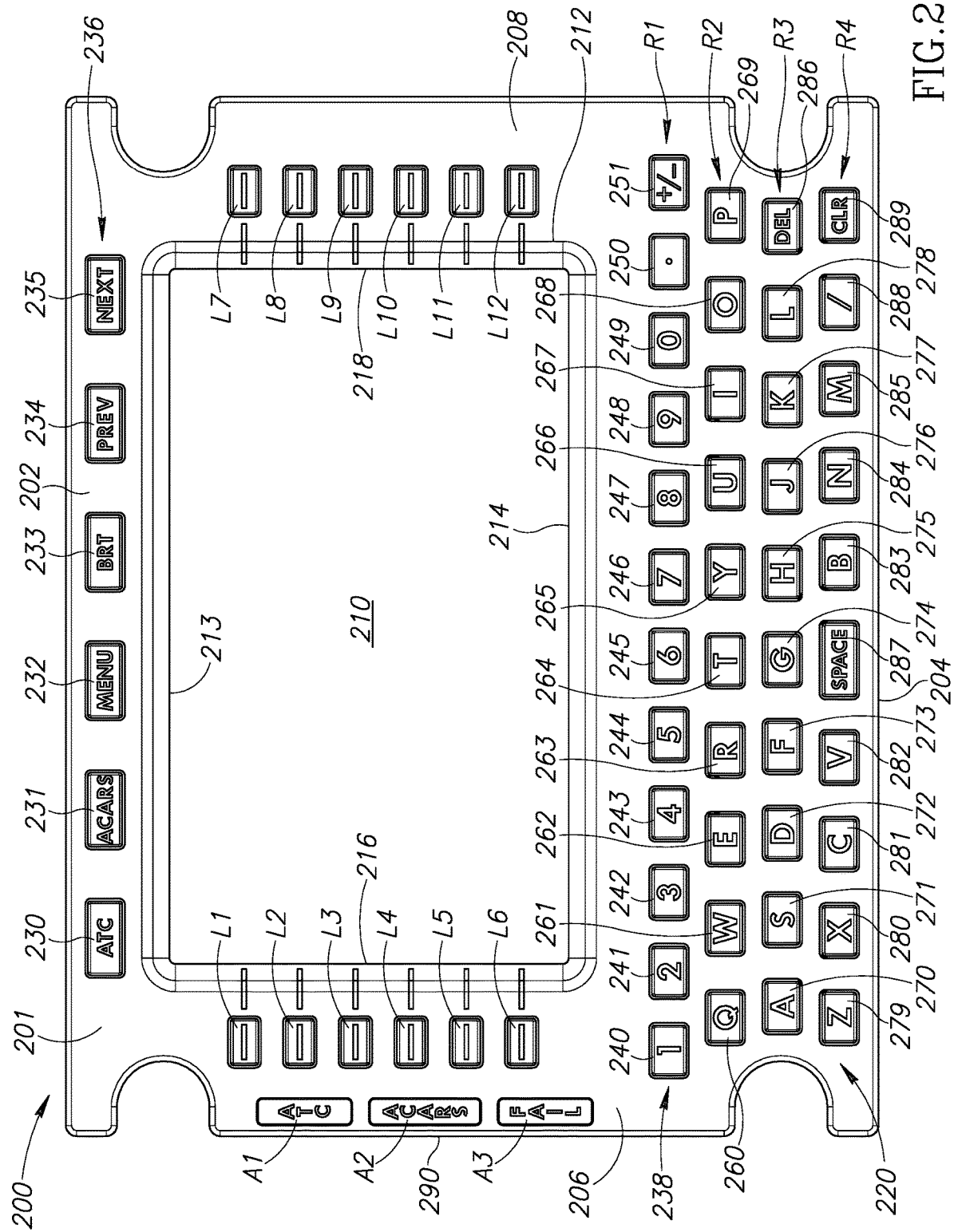
FIG. 2 is a front view of a faceplate, which surrounds a display and positions the keys of the interface device.

FIG. 2 illustrates a user interface 200 for inputting information into and/or receiving information from the interface device 100 (see FIG. 1). The user interface 200 illustrated includes a faceplate 201 that is generally rectangular in shape and has a top portion 202 opposite a bottom portion 204 and a left side portion 206 opposite a right side portion 208. In the embodiment illustrated, the faceplate 201 is about 4.44 inches tall and about 5.69 inches long. However, this is not a requirement.

The user interface 200 includes a display 210. The faceplate 201 is configured to at least partially surround a display 210, which is located at or near a center portion or display area 212 of the faceplate 201. Like the faceplate 201, the display 210 has a top portion 213 opposite a bottom portion 214 and a left side portion 216 opposite a right side portion 218. Information is displayed to the flight crew 106 (see FIG. 1) by the display 210. When the flight crew 106 (see FIG. 1) inputs information into the interface device 100 (see FIG. 1), the display 210 may be used to display that information in an input screen (referred to as a "Scratchpad"). The display 210 may be implemented as a conventional display device, such as a compact Control Display Unit ("CDU"), a liquid crystal display, and the like. For example, the display 210 may be implemented as a compact CDU that displays the information in dual colors and six lines. The CDU may be implemented as a sunlight readable +/−60° vertical and +/−70° horizontal viewable display.

The user interface 200 includes a unique and improved set of input keys 220 positioned by the faceplate 201. The input keys 220 are arranged in a unique layout that may be characterized as being a functional arrangement for providing aircraft avionics data input to one or more of the system(s) 102 and 104 (see FIG. 1).

Two or more of the input keys 220 may be combined (or repurposed) for multifunctional use. This allows the interface device 100 to serve as an interface to (or an array of) multiple known and intended systems, such as ACARS, CPDLC, ATN, FANS, and the like. The interface device 100 is easily adaptable for use with new systems.

The input keys 220 include hard buttons or function keys 230-235 positioned at or near the top portion 202 of the faceplate 201. The function keys 230-235 are apart from and positioned above the top portion 213 of the display 210. The (ATC) function key 230 may place the interface device 100 (see FIG. 1) in the first or second mode of operation. The (ATC) function key 230 provides access to Air Traffic Services ("ATS") messages as well as to CPDLC system functions. Selecting the (ATC) function key 230 allows access to an ATC Menu (not shown) through which the interface device 100 communicates with the CPDLC (or ATC) system. The ATC menu (not shown) allows the flight crew 106 to compose downlinks to the ATC system, send reports to the ATC system, send ATS messages (e.g., Oceanic Clearance Requests), and access a log of ATC messages. When a new uplink message is received from the ATC system, the flight crew 106 may view it immediately by selecting the (ATC) function key 230.

The (ACARS) function key 231 allows access to an AOC (Company) menu (not shown). The (ACARS) function key 231 may place the interface device 100 (see FIG. 1) in the third mode of operation. The flight crew 106 may use this selection and menus displayed by the display 210 to view and/or print a Load Sheet, send a Weather Request or Diversion Report, and to use other Company Defined messages. Thus, the function keys 230 and 231 may instruct the interface device 100 (see FIG. 1) to communicate with corresponding external aircraft avionics data systems, namely, the CPDLC system and ACARS, respectively.

The (MENU) function key 232 allows access to a top-level menu 300 (see FIG. 3), which provides quick access to the ATC Menu (not shown), and other systems (such as SATCOM) that can be controlled via the interface device 100.

The (BRT) function key 233 in conjunction with a key 251 (labeled "+/−" in FIG. 2) allows the flight crew 106 (see FIG. 1) to increase or decrease brightness of the display 210 manually.

The (PREV) function key 234 allows the flight crew 106 (see FIG. 1) to page back through menus displayed by the display 210 that include multiple pages or sub-menus (such as a LOGON/STATUS page). Similarly, the (NEXT) function key 235 allows the flight crew 106 (see FIG. 1) to page forward through such menus.

The function keys 230-235 may be arranged in a linear row 236. This unique arrangement sorts the function keys 230-235 from the outside to inside in a most used and easiest to locate order. In other words, the two most frequently used function keys 230 and 235 are positioned nearest to ends of the row 236 (e.g., nearest the side portions 206 and 208) and the two least frequently used function keys 232 and 233 are positioned farthest from the ends of the row 236 (e.g., farthest from the side portions 206 and 208). A natural chronological order of function keys 234 and 235 (representing previous and next, respectively) is provided for ease of use.

Annunciations A1-A3 are provided down the left side portion 206 of the faceplate 201. The annunciations A1-A3 are positioned by the faceplate 201 and may be vertically aligned with one another in a linear column. The annunciations A1-A3 are configured to indicate a state of the interface device 100 (see FIG. 1). By way of an example, the annunciations A1-A3 may light up to identify a current state of the interface device 100 (see FIG. 1). For example, the annunciation A1 (labeled "ATC") may light up when the interface device 100 (see FIG. 1) is configured to communicate with the CPDLC (or ATC) system. The annunciation A2 (labeled "ACARS") may light up when the interface device 100 (see FIG. 1) is configured to communicate with ACARS. The annunciation A3 (labeled "FAIL") may light up when the interface device 100 (see FIG. 1) encounters a failure.

The input keys 220 also include alphanumeric keys 238 positioned at or near the bottom portion 204. The alphanumeric keys 238 are apart from and positioned below the bottom portion 214 of the display 210. The intuitive arrangement of the function keys 230-235 at the top portion 202 of the faceplate 201 isolates these commonly used inputs from the alphanumeric keys 238, which improves user response time.

The alphanumeric keys 238 include number keys 240-249 and letter keys 260-285. In the example illustrated, the number keys 240-249 are arranged in a first linear row R1 and the letter keys 260-285 are arranged in second, third, and fourth linear rows R2-R4 positioned under the first row R1. In the first row R1, the number keys 240-249 and keys 250 and 251 are arranged left to right. The number keys 240-249 represent digits 1, 2, 3, 4, 5, 6, 7, 8, 9, and 0, respectively. The key 250 represents a period or a decimal point (labeled "." in FIG. 2). The key 251 represents positive or negative (labeled "+/−" in FIG. 2).

In the second row R2, the letter keys 260-269 are arranged left to right and represent letters Q, W, E, R, T, Y, U, I, O, and P, respectively. In the third row R3, the letter keys 270-278 and a key 268 are arranged left to right. The letter keys 270-278 represent letters A, S, D, F, G, H, J, K, and L, respectively. The last key 286 in the third row R3 represents or implements a delete function (labeled "DEL" in FIG. 2).

The (DEL) key 286 is used to delete an entry (in an entry location) from the display 210.

In the fourth row R4, the letter keys 279-282, a key 287, the letter keys 283-285, and keys 288 and 289 are arranged left to right. The letter keys 279-285 represent letters Z, X, C, V, B, N, and M, respectively. The key 287 represents or implements a space function (labeled "SPACE" in FIG. 2). The key 287 is positioned between the letter keys 282 and 283 representing letters V and B, respectively. Also, in the fourth row R4, the key 288 represents or implements a forward slash (labeled "I" in FIG. 2) and the last key 289 represents or implements a clear function (labeled "CLR" in FIG. 2). Pressing the (CLR) key 289 clears the display 210 of any values entered into entry locations of the display 210. Thus, the (CLR) key 289 may be used to clear the contents of the Scratchpad.

In the embodiment illustrated, the alphanumeric keys 238 include only the most commonly used alphanumeric and symbolic keys (which correspond to the keys 240-289), which improves input time by illuminating clutter and user search time for specific keys. This unique arrangement places the keys 250, 251, 286, 288, and 289 representing special symbols at the outer right hand side for quick location, while keeping the (SPACE) key 287 in a more natural centered home location.

In the embodiment illustrated, the alphanumeric keys 238 implement at least a portion of a standard QWERTY keyboard. However, as is apparent to those of ordinary skill in the art, the alphanumeric keys 238 may be modified to represent numbers and letters of different alphabets and languages. Further, the alphanumeric keys 238 may be arranged differently (e.g., placed in different rows, placed in a different number of rows, and/or ordered differently within the rows).

Data may be entered into the interface device 100 (see FIG. 1) using the alphanumeric keys 238 (and viewed on the Scratchpad or an input screen) and/or by selecting one or more line select keys ("LSKs") L1-L12 positioned alongside the display 210. The LSKs L1-L6 are used to select lines displayed along the left side portion 216 of the display 210 and the LSKs L7-L12 are used to select lines displayed along the right side portion 218 of the display 210. The (left) LSKs L1-L6 are vertically aligned and positioned along the left side portion 216 of the display 210. On the other hand, the (right) LSKs L7-L12 are vertically aligned and positioned along the right side portion 218 of the display 210. In the embodiment illustrated, the annunciations A1-A3 are located along the left side portion 206 of the faceplate 201 between the LSKs L1-L6 and a peripheral edge 290 of the faceplate 201.

Figure 5:
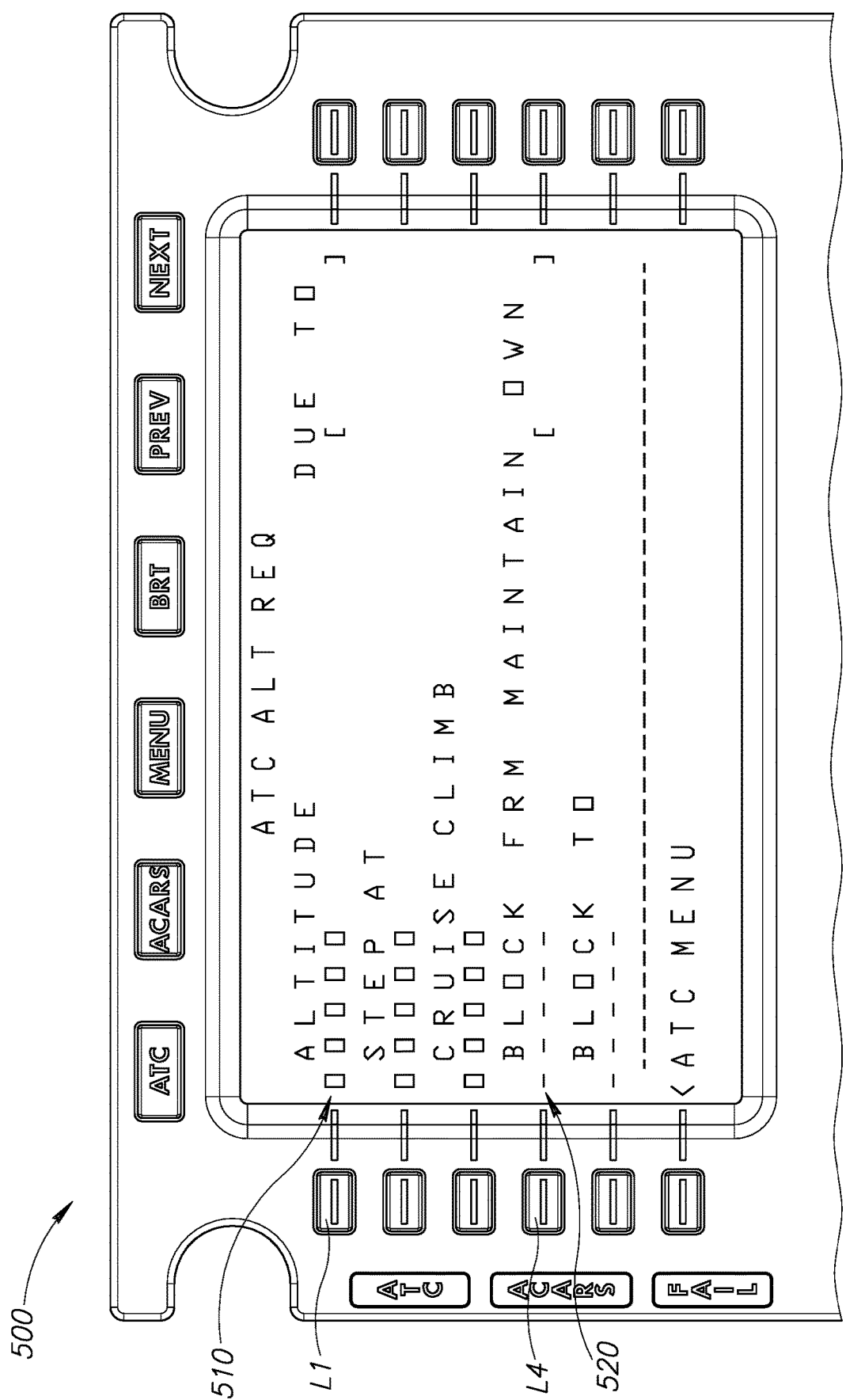
FIG. 5 is a front view of the faceplate, the keys, and the display displaying a data input screen.

FIG. 5 depicts a data input screen 500, in which boxes 510 identify entry locations for mandatory data, and dashes 520 identify entry locations for optional data. In FIG. 5, the boxes 510 are positioned next to and aligned with the LSK L1. The boxes 510 appear under a label "ALTITUDE." Data (e.g., the current altitude of aircraft 105 illustrated in FIG. 1) may be entered into the boxes 510 by selecting the LSK L1 and using the alphanumeric keys 238 to enter information. Optionally, data may be entered into the dashes 520 by selecting the LSK L4 (which is aligned with the dashes 520) and using the alphanumeric keys 238 to enter information. The option to SEND a message may be unavailable until after all of the mandatory data has been entered.

The LSKs L1-L12 may be used to implement menu navigation shortcuts. For example, referring to FIG. 3, the top-level menu 300 (displayed by the display 210) lists three options "ATC," "ACARS," and "MAINT" next to and aligned with LSKs L2, L8, and L12, respectively. The flight crew 106 (see FIG. 1) may select one of the LSKs L2, L8, and L12 to select the corresponding option. For example, when the LSK L2 is selected, the option "ATC" is selected and the display 210 displays the ATC menu (not shown). The (ATC) function key 230 and the LSK L2 both provide access to the ATC menu (not shown), which may be used to access ATS messages as well as CPDLC functions.

Figure 3:
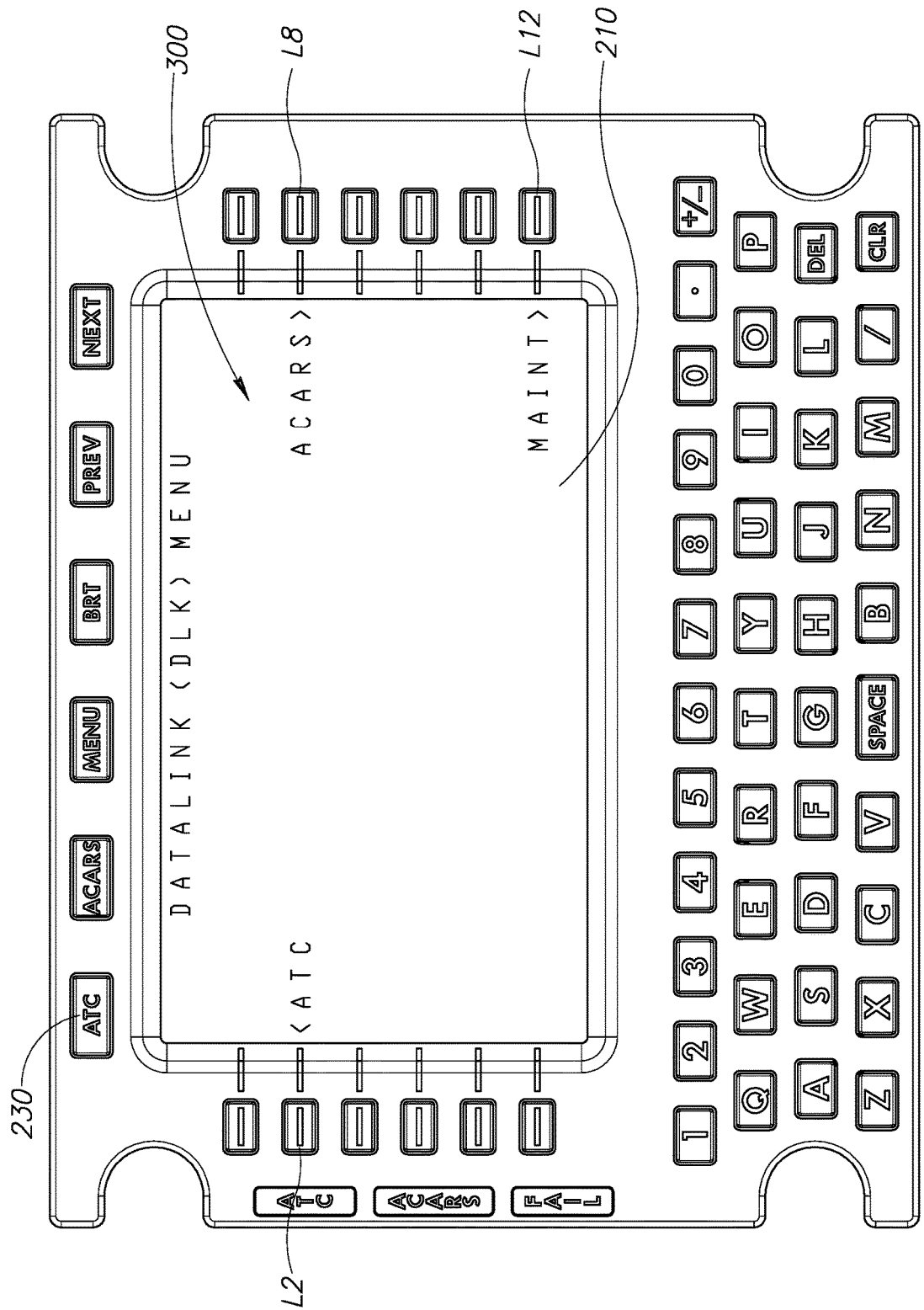
FIG. 3 is a front view of the faceplate, the keys, and the display displaying a top-level menu.
Figure 4:
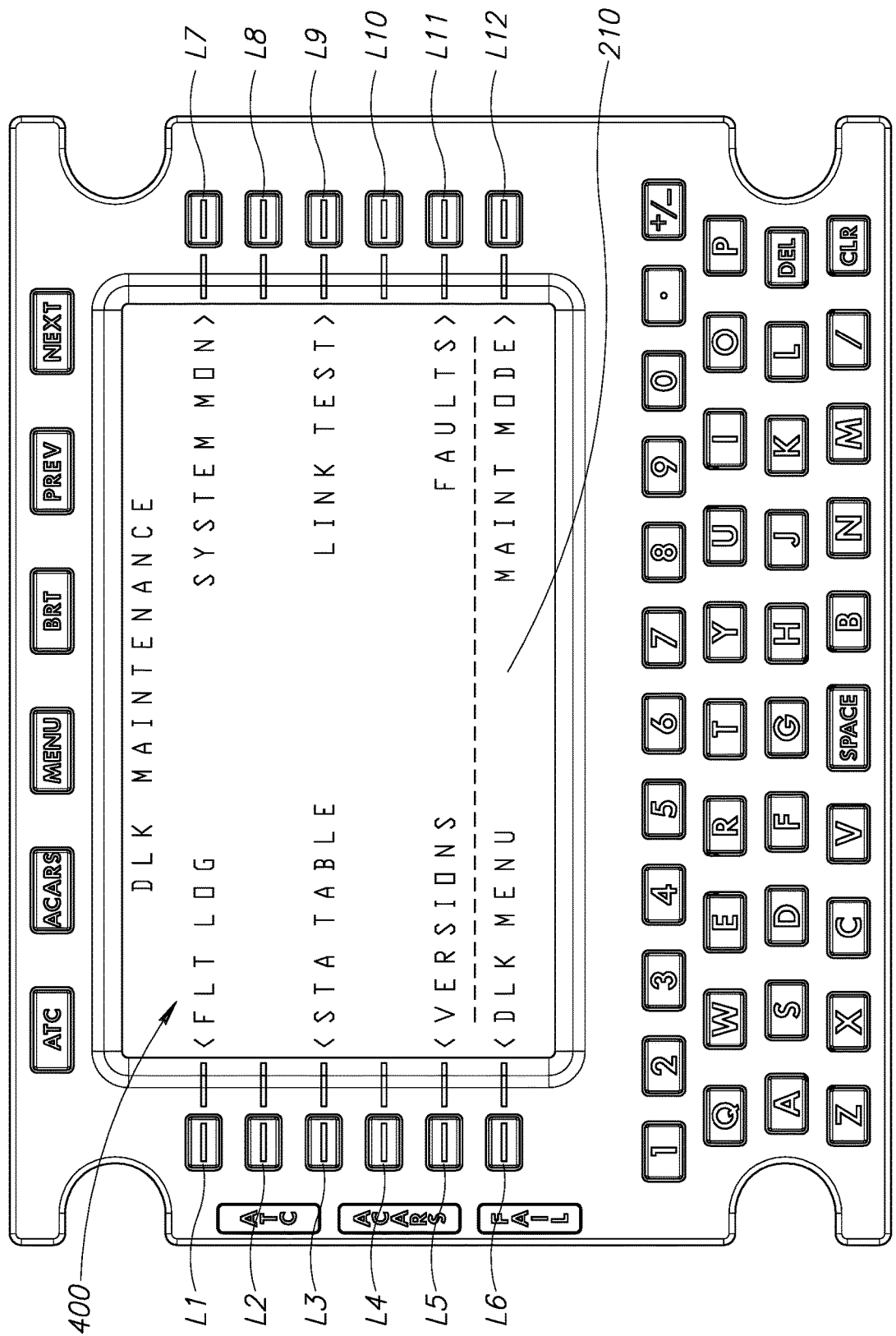
FIG. 4 is a front view of the faceplate, the keys, and the display displaying a maintenance page.

FIG. 4 depicts the display 210 after the flight crew 106 (see FIG. 1) has selected and pressed the LSK L12 in FIG. 3, which corresponds to the "MAINT" function. Referring to FIG. 4, the display 210 shows a maintenance screen or page 400 with the selectable options listed in Table A below.

TABLE A

| LSK | Option | Short Description of Corresponding Function |
|---|---|---|
| L1 | FLT LOG | Current flight Out-Off-On-In times, fuel, flight number and date for in addition to previous three flights. |
| L3 | STA TABLE | Current VHF ground station connectivity and VHF Mode |
| L5 | VERSIONS | View of system configuration part numbers and versions including personality module configuration for customer's installation. |
| L7 | SYSTEM MON | Current OOOI state, tuned frequency, and other status information |
| L9 | LINK TEST | Test ACARS or AVLC connectivity |
| L11 | FAULTS | Current fault list (if any) |
| L6 | DLK MENU | Menu navigation back to main menu |
| L12 | MAINT MODE | Password protected maintenance functions only available when aircraft is on ground. |

Figure 6:
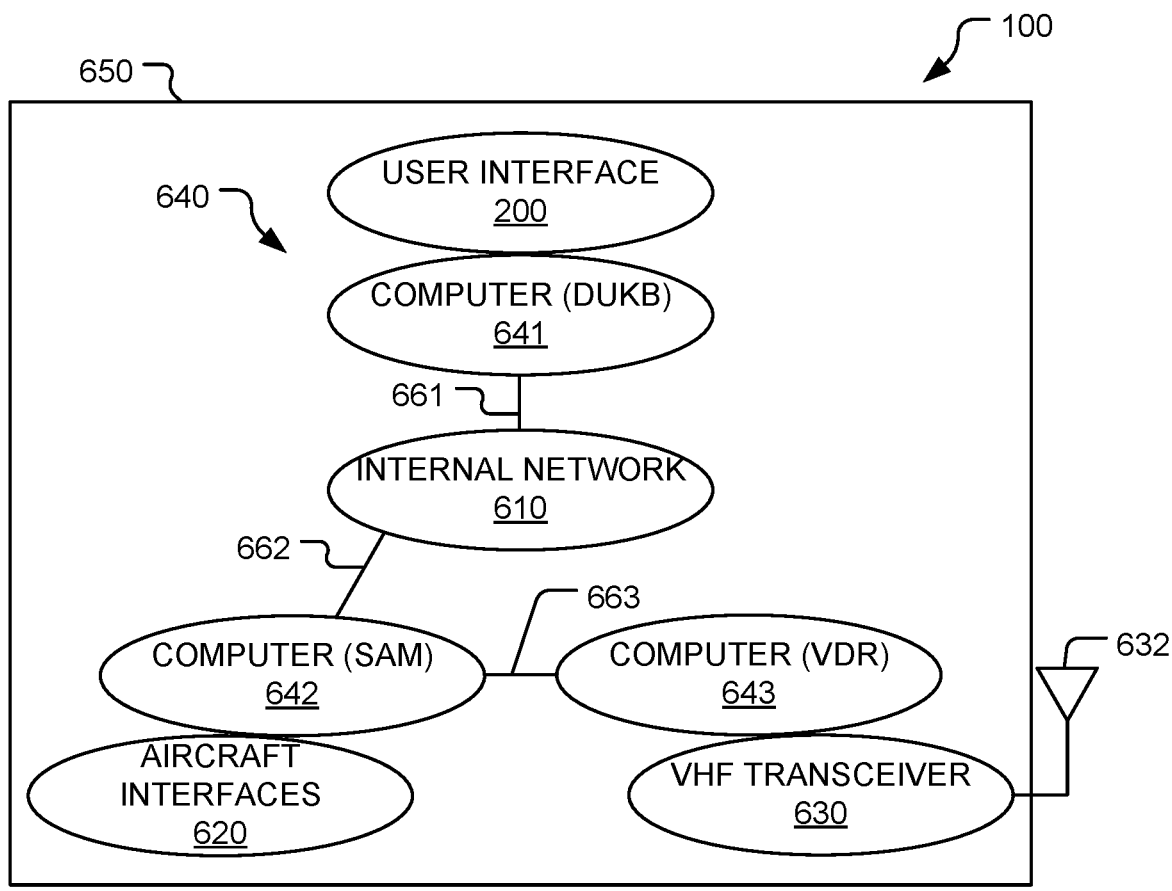
FIG. 6 is an illustration of an exemplary portion of components of the interface device of FIG. 1.

FIG. 6 illustrates an exemplary implementation of the interface device 100. The interface device 100 illustrated includes the user interface 200, an internal network 610, one or more aircraft interfaces 620, a very high frequency ("VHF") radio or transceiver 630, an antenna 632, and one or more computers 640. The VHF transceiver 630 is connected to the antenna 632. VHF is defined by the International Telecommunication Union as radio waves within a range of 30 megahertz ("MHz") to 300 MHz.

In the embodiment illustrated in FIG. 6, the computer(s) 640 include first, second, and third computers 641, 642, and 643. However, the functionality attributed to each of the computers 641, 642, and 643 may be distributed to any number of computing devices (e.g., each like a computing device 12 illustrated in FIG. 9 and described below). For example, the functionality attributed to each of the computers 641, 642, and 643 may be incorporated into a single computing device. At least a portion of each of the internal network 610, the aircraft interface(s) 620, the VHF transceiver 630, and the computer(s) 640 are housed inside an outer enclosure 650. Referring to FIG. 2, the faceplate 201 of the user interface 200 may form a portion of the enclosure 650 (see FIG. 6). Referring to FIG. 6, the antenna 632 may be entirely outside the enclosure 650. For example, the antenna 632 may be attached to an outside of the enclosure 650. Alternatively, the antenna 632 may be housed entirely inside the enclosure 650 or have a portion that extends outwardly beyond the enclosure 650. By way of a yet another non-limiting example, the antenna 632 may be separate from the enclosure 650 and connected to the VHF transceiver 630 by a transmission line (not shown).

Figure 7:
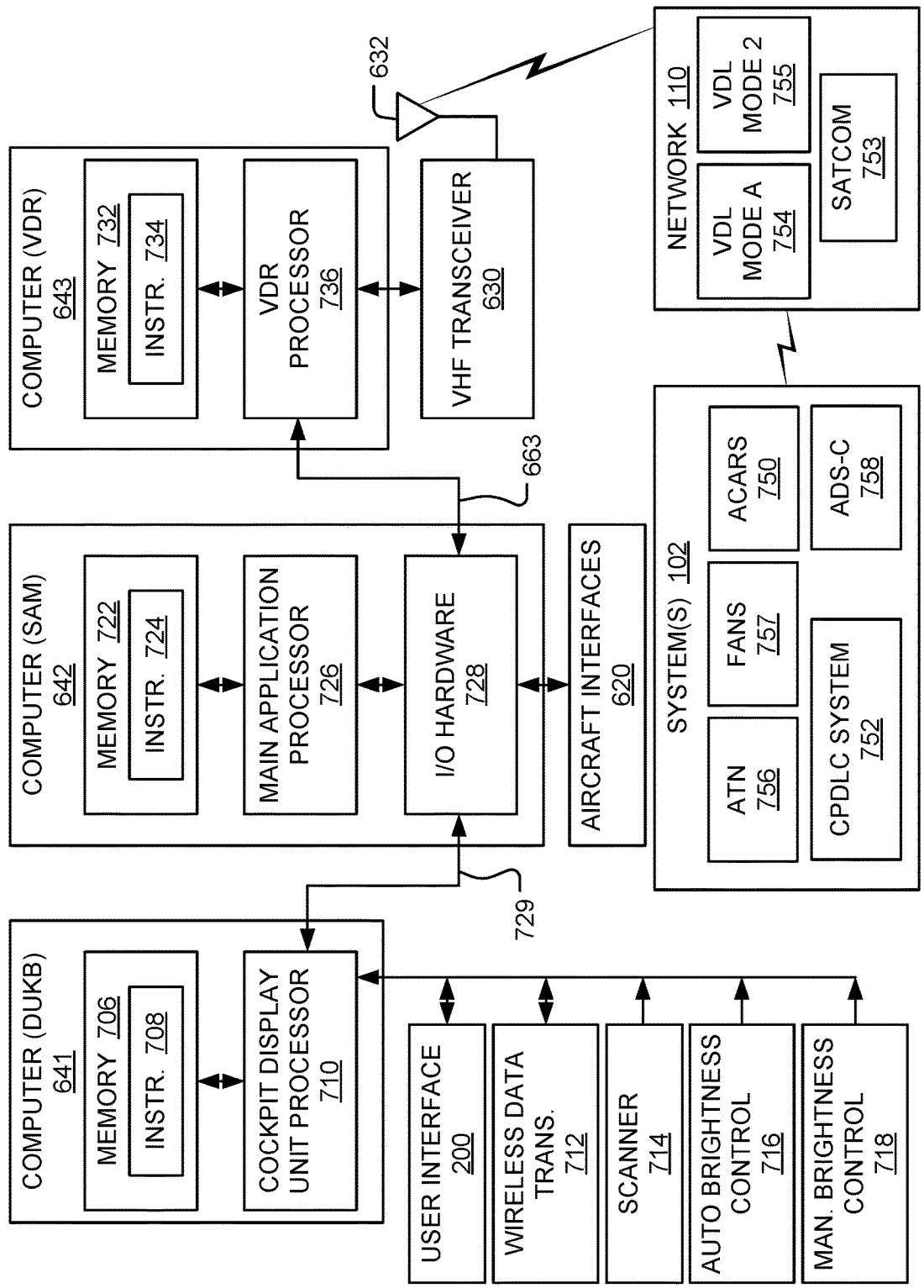
FIG. 7 is a block diagram illustrating communication implemented by computing devices of the interface device of FIG. 1.

As described above, referring to FIG. 2, the user interface 200 provides menu navigation and may be used to enter communications manually. The display 210 may be used to display the menus as well as any communications entered into or received by the interface device 100 (see FIGS. 1 and 6). Referring to FIG. 6, the first (DUKB) computer 641 is configured to communicate with the user interface 200 and the internal network 610. The term "DUKB" stands for display unit and keyboard. The first (DUKB) computer 641 is connected to the internal network 610 by a first connection 661. Referring to FIG. 7, the first (DUKB) computer 641 may include memory 706 that stores instructions 708 configured to be executed by a cockpit display unit processor 710. By way of non-limiting examples, the memory 706 may be implemented as a system memory 22 (see FIG. 9) and the cockpit display unit processor 710 may be implemented as a processing unit 21 (see FIG. 9).

The processor 710 may be connected to the user interface 200, a wireless (e.g., Bluetooth) data transmitter 712, a scanner 714, an automatic brightness control 716, and/or a manual brightness control 718. The wireless (e.g., Bluetooth) data transmitter 712 may be used to transmit a low power (e.g., Bluetooth) broadcast of ACARS AOC message data over the wireless link. The scanner 714 is configured to scan the keyboard (e.g., the alphanumeric keys 238 illustrated in FIG. 2) for button presses. The processor 710 receives a brightness signal from at least one of the brightness controls 716 and 718 and adjusts the brightness of the display 210 (see FIGS. 2-4) and/or the keyboard (e.g., the alphanumeric keys 238 illustrated in FIG. 2) of the user interface 200 based at least in part on the brightness signal. The user interface 200 may include a Controller Area Network (or CAN bus) with an interface configured to be connected to a dimming bus (not shown), which is connected to the display 210 and the keyboard (e.g., the alphanumeric keys 238) to implement brightness control.

Referring to FIG. 6, the second (SAM) computer 642 is configured to communicate with the aircraft interface(s) 620, the internal network 610, and the third (VDR) computer 643. The term "SAM" stands for system application module. The second (SAM) computer 642 is connected to the internal network 610 by a second connection 662 and the third (VDR) computer 643 by a third connection 663.

Figure 8:
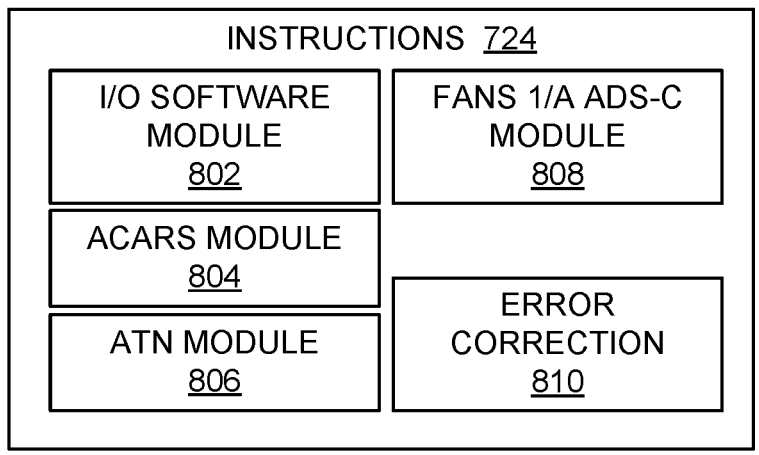
FIG. 8 is a block diagram illustrating software modules stored by memory of one or more of the computing devices of the interface device of FIG. 1.

Referring to FIG. 7, the second (SAM) computer 642 may include memory 722 that stores instructions 724 configured to be executed by a main application processor 726. By way of non-limiting examples, the memory 722 may be implemented as the system memory 22 (see FIG. 9) and the main application processor 726 may be implemented as the processing unit 21 (see FIG. 9). The processor 726 may be connected to an I/O hardware interface 728 configured to communicate with the first (DUKB) computer 641 over the second connection 662 and the internal network 610, which are illustrated by a double headed arrow 729. The I/O hardware interface 728 may be configured to communicate with the third (VDR) computer 643 (e.g., via the third connection 663). Referring to FIG. 8, the instructions 724 may include an input/output ("I/O") software module 802, an ACARS module 804, an ATN module 806, a FANS 1/A ADS-C module 808, and an error correction module 810.

The I/O hardware interface 728 (see FIG. 7) and/or the I/O software module 802 implement common and/or platform dependent I/O. As will be described below, the I/O hardware interface 728 along with the ATN module 806 and/or the FANS 1/A ADS-C module 808 implement Controller-Pilot Data Link messaging. The I/O hardware interface 728 and the FANS 1/A ADS-C module 808 implement ADS-C messaging. The I/O hardware interface 728 and/or the ACARS module 804 implement ACARS Aeronautical Operational Control ("AOC") messaging and/or ACARS Air Traffic Services ("ATS") messaging. The I/O hardware interface 728 may also implement built-in-test capabilities.

Referring to FIG. 6, the third (VDR) computer 643 is configured to communicate with the VHF transceiver 630 and the second (SAM) computer 642 (e.g., via the third connection 663). The term "VDR" stands for VHF data link radio. Referring to FIG. 7, the third (VDR) computer 643 may include memory 732 that stores instructions 734 configured to be executed by a VDR processor 736. By way of non-limiting examples, the memory 732 may be implemented as the system memory 22 (see FIG. 9) and the VDR processor 736 may be implemented as the processing unit 21 (see FIG. 9). The third (VDR) computer 643 is configured to receive communications entered into the user interface 200 that were transmitted to the third (VDR) computer 643 by the first (DUKB) computer 641, the internal network 610, and the second (SAM) computer 642. The third (VDR) computer 643 transmits such communications to one or more of the system(s) 102 (see FIG. 1) via the VHF transceiver 630 and the antenna 632. Similarly, the third (VDR) computer 643 may receive communications from one or more of the system(s) 102 (see FIG. 1) via the VHF transceiver 630 and the antenna 632 and send the received communications to the user interface 200 via the second (SAM) computer 642, the internal network 610, and the first (DUKB) computer 641.

The third (VDR) computer 643 is configured to transmit communications via the VHF transceiver 630 and the antenna 632 in multiple modes. By way of non-limiting examples, the third (VDR) computer 643 may transmit in Mode 0 VHF, Mode A VHF, and/or Mode 2 VHF.

Referring to FIG. 6, the internal network 610 may include the Controller Area Network (or CAN bus), a conventional bus, or any other means for implementing communication between the computer 641-643. The internal network 610 may be implemented as an Ethernet network that transmits internal communications between the computers 641-643.

The aircraft interface(s) 620 is/are configured to communicate with the system(s) 104 (see FIG. 1) located on the aircraft 105 (see FIG. 1). The system(s) 104 (see FIG. 1) may include the FMC. In addition to the interface device 100 exchanging messages with ground systems directly from the flight deck through the display 210 (see FIGS. 2-4), which may be characterized as being a dedicated control display unit ("CDU"), the aircraft interface(s) 620 is/are capable of interfacing with a number of the aircraft system(s) 104 (see FIG. 1) to facilitate automatic generation and transmission of routine and other types of messages (e.g., OOOI events, position reports, engine monitoring, fault warnings, etc.). For example, the aircraft interface(s) 620 may include one or more of the following interfaces:

1. A number (e.g., up to eighteen) of ARINC 429 receivers 622 (see FIG. 9) and a number (e.g., seven) of ARINC 429 transmitters 624 (see FIG. 9). Transmit channels implemented by these ARINC 429 receivers and transmitters 622 and 624 are able to support a variety of devices including ARINC 740/744 printers and ARINC 741 Satellite Data Units ("SDUs"), as well as interface with other ARINC 619 protocol devices.

2. A maintenance Ethernet connection 626 (see FIG. 9), which during manufacturing is used to test and configure the interface device 100 (see FIGS. 1 and 6). As mentioned above, the internal network 610 may be implemented as an Ethernet network. In such embodiments, the maintenance Ethernet connection 626 may be connected to the internal network 610. If the maintenance Ethernet connection 626 is connected to an Ethernet connector (not shown) on the aircraft 105 (see FIG. 1), a laptop loader tool can be connected to the interface device 100 and used to test and/or configure the interface device 100 in place. Otherwise, the interface device 100 must be removed from the aircraft 105 to be configured and/or tested via the maintenance Ethernet connection 626 (e.g., during a maintenance return).

3. An Ethernet connection or interface 628 (see FIG. 9) may be provided to interface with external avionics bus protocol devices. As mentioned above, the internal network 610 may be implemented as an Ethernet network. In such embodiments, the Ethernet interface 628 may be connected to the internal network 610. An Interface Control Definition may be developed for data parameters obtained by the external avionics bus protocol devices utilizing protocols such as Avionics Standard Communication Bus ("ASCB").

The VHF transceiver 630 is small enough to fit inside the enclosure 650 of the interface device 100. For example, the VHF transceiver 630 may be embedded inside the enclosure 650. The inclusion of the VHF transceiver 630 in the interface device 100 is an improvement over prior art aviation communication methods that require a separate VHF transceiver (e.g., an A750 radio). By including the VHF transceiver 630 in the interface device 100, the external I/O hardware and software (A429, discretes) of the separate or standalone VHF transceiver may be eliminated. A429 refers to an Aeronautical Radio INC. ("ARINC") technical standard that defines physical and electrical interfaces between devices and the separate VHF transceiver. In contrast, in the interface device 100, the VHF transceiver 630 is contained within the enclosure 650. Thus, with regard to the interface device 100, A429 defines physical and electrical interfaces between the internal components (e.g., the computers 641-643) and the VHF transceiver 630.

Also, in the interface device 100, functions may be allocated to different computers. For example, a standalone A750 radio contains error correction software. However, in the interface device 100, the error correction module 810 (see FIG. 8) may include error correction software implemented by the second (SAM) computer 642. The error correction software may cause the second (SAM) computer 642 to correct transmission errors in messages received by the VHF transceiver 630. By incorporating the VHF transceiver 630 in the interface device 100, voice capabilities, which are provided by prior art standalone VHF transceivers, are eschewed. Removing the ability of the VHF transceiver 630 to transmit voice messages lowers required duty cycle, reduces performance requirements, and simplifies the software.

The VHF transceiver 630 may be implemented as an aviation data link transceiver configured to operate in the VHF of 118.0 MHz to 137.0 MHz. By way of a non-limiting example, the VHF transceiver 630 may be implemented as a radio frequency transmitter disclosed in U.S. patent application Ser. No. 13/216,861, filed on Aug. 24, 2011, and incorporated herein by reference in its entirety. By using this transmitter to implement the VHF transceiver 630, direct current ("DC") power needs as well as heat dissipation may be reduced when compared to prior art standalone VHF transceivers. The VHF transceiver 630 may include or be connected to an amplifier protection system disclosed in U.S. patent application Ser. No. 13/216,876, filed on Aug. 24, 2011, and incorporated herein by reference in its entirety. The amplifier protection system includes active circuitry and software that measures a quality of a connection with the antenna 632 to prevent self-damage to the VHF transceiver 630. Thus, the VHF transceiver 630 is actively protected from a bad or malfunctioning antenna as well as from a bad connection with the antenna 632.

In the implementation illustrated in FIG. 6, the interface device 100 may be characterized as being an aviation communication device. The interface device 100 may be implemented as an all-in-one self-contained (e.g., in the enclosure 650) aviation datalink communications management unit configured to communicate with the system(s) 102 (see FIGS. 1 and 7) over the network 110 (see FIGS. 1 and 7). Referring to FIG. 7, in the embodiment illustrated, the interface device 100 (see FIGS. 1 and 6) is configured to communicate with ACARS 750 and the CPDLC system 752 over the network 110.

As mentioned above, referring to FIG. 1, the interface device 100 may operate in multiple modes. For example, referring to FIG. 7, the interface device 100 may operate in the (first) FANS 1/A CPDLC and ADS-C mode, in which the network 110 may be implemented using a SATCOM network 753 and the system(s) 102 may be implemented as the CPDLC system 752 and/or an ADS-C system 758. Referring to FIG. 8, the first mode may be implemented at least in part by the FANS 1/A ADS-C module 808. In the FANS 1/A CPDLC and ADS-C mode, the aircraft 105 (see FIG. 1) may communicate over a FANS network 757 with the CPDLC system 752.

Referring to FIG. 7, the interface device 100 (see FIGS. 1 and 6) may operate in the (second) ATN CPDLC mode, in which the system(s) 102 may be implemented as the CPDLC system and the network 110 may be implemented as a VDL Mode 2 network 755 (see FIG. 7). Referring to FIG. 8, the second mode may be implemented at least in part by the ATN module 806. In the ATN CPDLC mode, the aircraft 105 (see FIG. 1) may communicate over an ATN network 756 with the CPDLC system 752.

The interface device 100 may operate in the (third) ACARS mode, in which the system(s) 102 may be implemented as ACARS 750 and the network 110 is implemented as the SATCOM, VDL Mode A, and/or VDL Mode 2 networks 753-755. Thus, in the third mode, the aircraft 105 (see FIG. 1) may communicate over the VDL Mode A (or Mode 0) network 754 and/or the VDL Mode 2 network 755 with ACARS 750. Referring to FIG. 8, the ACARS mode may be implemented at least in part by the ACARS module 804.

Through the sophisticated I/O and software protocol stack (e.g., implemented by the I/O hardware interface 728 and the I/O software module 802), the interface device 100 operates over the ACARS 750 and the ATN network 756 simultaneously as well as over the ACARS 750 and the FANS network 757 simultaneously. The ability to communicate over both the ATN and FANS networks 756 and 757 is referred to as a "Dual Stack" system.

The interface device 100 provides flight crews with the capability of sending and receiving CPDLC and ACARS messages over the SATCOM, VDL Mode A, and VDL Mode 2 networks 753-755. For example, the interface device 100 provides CPDLC messaging between flight crews and air traffic control and between flight crews and an airline's Airline Operations Center ("AOC"). The interface device 100 may be configured to provide CPDLC compliance with both ATN Baseline 1 network (e.g., using the ATN module 806) and FANS 1/A network (e.g., using the FANS 1/A ADS-C module 808) along with providing a flexible ACARS solution to satisfy the most demanding requirements of an airlines flight operations and maintenance departments.

In unison with the FANS application functionality, the FANS 1/A ADS-C module 808 implements support for the ADS-C system 758, which is primarily used by ATC for surveillance of the aircraft 105 (see FIG. 1). ADS-C functions implemented by the FANS 1/A ADS-C module 808 allow the aircraft 105 (see FIG. 1) to automatically transmit relevant surveillance information requested with the ADS Contract. The flight crew may have no control over what information is sent for each of the ADS-C messages but may be able to disable the function.

Flight crews may use the interface device 100 to carry out AOC message exchanges with dispatch centers and other airline departments as well as Air Traffic Services ("ATS") communications with ATS providers. Referring to FIG. 2, a Multi-function Control Display Unit ("MCDU") screen, the LSKs L1-L6, and keyboard (e.g., the alphanumeric keys 238) of the user interface 200 allow flight crews to navigate through different menus as well as to display and respond to uplinked messages.

As mentioned above, the interface device 100 may operate in three different modes: (1) the FANS 1/A CPDLC (and ADS-C) mode, (2) the ATN CPDLC mode, and (3) the ACARS mode. Further, the interface device 100 may be configured to operate in two or more of these modes simultaneously. Depending on an airline's operational area and desired capabilities, the interface device 100 may be factory configured to support one or more of the following seven operational mode combinations:

1. FANS 1/A CPDLC, ATN CPDLC, and ACARS modes;
2. FANS 1/A CPDLC and ACARS modes;
3. FANS 1/A CPDLC and ATN CPDLC modes;
4. ATN CPDLC and ACARS modes;
5. ATN CPDLC mode only;
6. FANS 1/A CPDLC mode only; and
7. ACARS mode only.

The interface device 100 may be configured to perform data link functions in accordance with FAA Advisory Circular AC 20-140C, "Guidelines for Design Approval of Aircraft Data Link Communications Systems Supporting Air Traffic Services (ATS)."

ACARS Functionality

Referring to FIG. 8, as mentioned above, the instructions 724 may include the ACARS module 804, which implements the (third) ACARS mode of operation and provides the ACARS functionality. The ACARS module 804 may initiate automatic downlinks associated with aircraft movements and transitions. Downlinks between flight phases such as Out/Off/On/In ("OOOI") messages allow airlines to track flight progress while eliminating time-consuming and error-prone manual entries.

ACARS functions implemented by the ACARS module 804 and supported by the interface device 100 may include ARINC 619 ("A619") protocol connections over ARINC 429 data busses. Such connections enable the transfer of messages, such as engine reports, from avionics such as Digital Flight Data Acquisition Units ("DFDAU"). These messages do not require flight crew interaction to downlink. The A619 protocol is also used when connecting to the Flight Management Computer to transfer uplinked Winds Aloft information.

In addition to automated reports being downlinked from devices, the interface device 100 supports custom messages through the use of standard ACARS User Defined Message Labels. These messages are created from customer requirements and can be manually or automatically triggered. Automatic triggering of messages is performed by "events" associated with the downlink message. Events may be configured for a windowed parameter value with a specified duration. Standard comparison operators are also applied, such as ">" (greater than).

Within the ACARS functionality is support for ATS messages. These messages include the following:

1. D-ATIS;
2. DEPARTURE CLEARANCES;
3. OCEANIC CLEARANCES;
4. PUSHBACK CLEARANCES;
5. TWIP (Terminal Weather Information for Pilots—U.S.); and
6. TAXI CLEARANCES.

All uplink (or incoming) and downlink (or outgoing) messages received by and sent from the interface device 100 are received from and sent through one or more VDL Mode 0/A ground station, Mode 2 ground station, and/or SATCOM media connection.

ATN/CPDLC Functionality

Referring to FIG. 8, as mentioned above, the instructions 724 may include the ATN module 806, which implements the (second) ATN CPDLC mode of operation and provides the ATN/CPDLC functionality. The ATN module 806 provides flight crews with the capability to send and receive CPDLC messages. The ATN Baseline 1 implementation within the interface device 100 may be configured to support Protective Mode-CPDLC ("PM-CPDLC") per ICAO 9705-AN956 (partial implementation per EUROCONTROL specification 0116 ver 2.1) and to meet the LINK2000+Data Link Services ("DLS") mandate requirements for European airspace.

The ATN CPDLC mode of operation enables flight crews to request the following types of clearances:

1. Vertical;
2. Speed;
3. Route; and
4. Route—Weather Deviation.

FANS 1/A CPDLC and ADS-C Functionality

Referring to FIG. 8, as mentioned above, the instructions 724 may include the FANS 1/A ADS-C module 808, which implements the (first) FANS 1/A CPDLC and ADS-C mode of operation and provides the FANS 1/A CPDLC and ADS-C functionality. The FANS 1/A ADS-C module 808 provides FANS 1/A CPDLC message capability to exchange requests and clearance instructions with air traffic control. For surveillance, the FANS 1/A ADS-C module 808 establishes ADS Contracts between the Air Traffic Services Unit and the aircraft 105 (see FIG. 1) to report position and flight plan progress as a means of insuring proper separation between different aircraft when on route.

Operational requirements may be obtained from the ICAO Global Data Link Manual (GOLD). Guidance within AC 20-140B is compatible with the GOLD.

Computing Device

Figure 9:
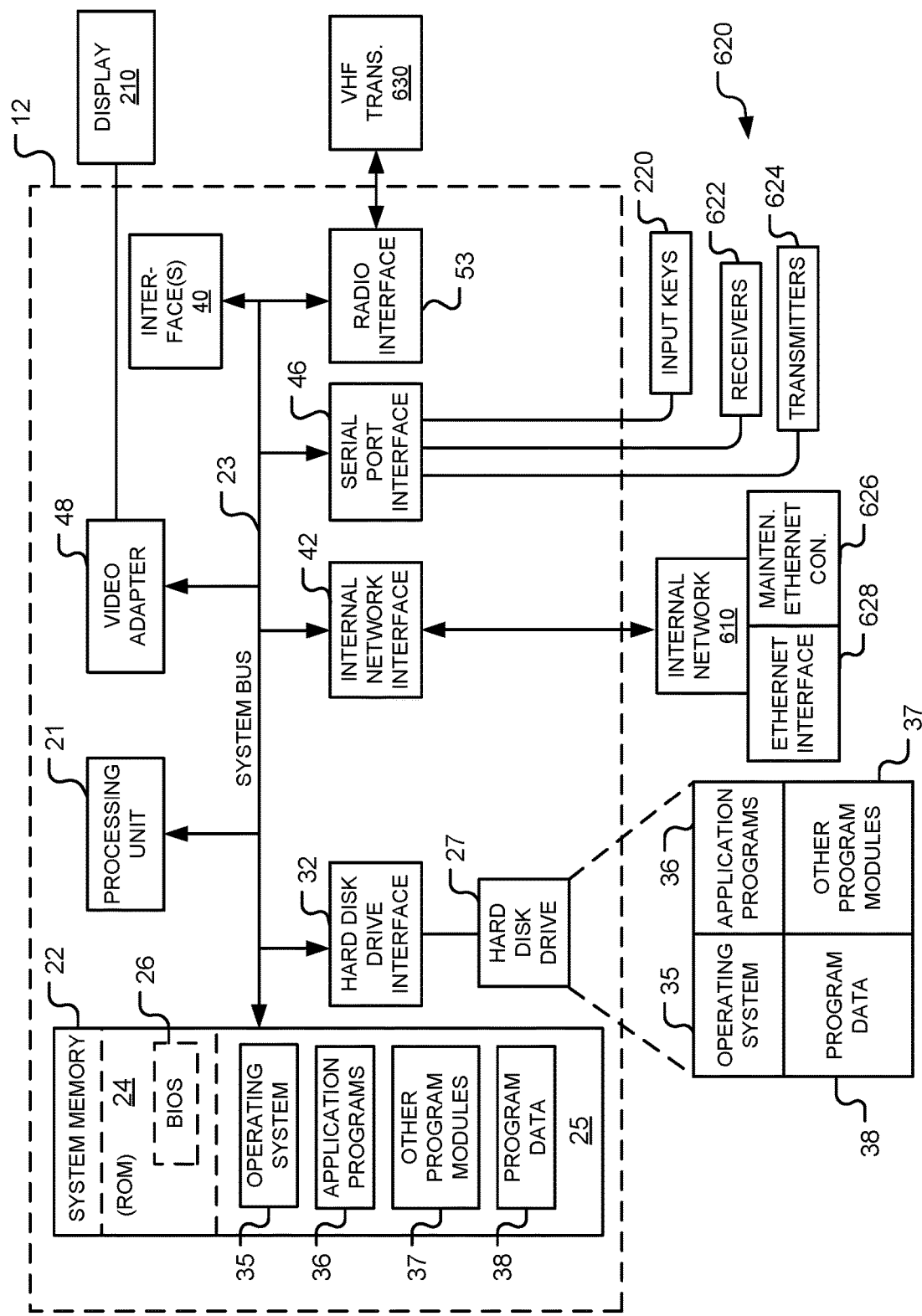
FIG. 9 is a diagram of a hardware environment and an operating environment in which the computing devices of FIGS. 6 and 7 may be implemented.

FIG. 9 is a diagram of hardware and an operating environment in conjunction with which implementations of the one or more computing devices of the interface device 100 (see FIGS. 1 and 6) may be practiced. The description of FIG. 9 is intended to provide a brief, general description of suitable computer hardware and a suitable computing environment in which implementations may be practiced.

The exemplary hardware and operating environment of FIG. 9 includes a general-purpose computing device in the form of the computing device 12. Each of the computing devices of FIGS. 6 and 7 (including the first (DUKB) computer 641, the second (SAM) computer 642, and the third (VDR) computer 643) may be substantially identical to the computing device 12.

The computing device 12 includes the system memory 22, the processing unit 21, and a system bus 23 that operatively couples various system components, including the system memory 22 to the processing unit 21. There may be only one or there may be more than one processing unit 21, such that the processor of computing device 12 includes a single central-processing unit ("CPU"), or a plurality of processing units, commonly referred to as a parallel processing environment. When multiple processing units are used, the processing units may be heterogeneous. By way of a non-limiting example, such a heterogeneous processing environment may include a conventional CPU, a conventional graphics processing unit ("GPU"), a floating-point unit ("FPU"), combinations thereof, and the like.

The system bus 23 may be any of several types of bus structures including a memory bus or memory controller, a peripheral bus, and a local bus using any of a variety of bus architectures. The system memory 22 may also be referred to as simply the memory, and includes read only memory (ROM) 24 and random access memory (RAM) 25. A basic input/output system (BIOS) 26, containing the basic routines that help to transfer information between elements within the computing device 12, such as during start-up, is stored in ROM 24.

The computing device 12 may include a hard disk drive 27 for reading from and writing to a hard disk (not shown). The hard disk drive 27 is connected to the system bus 23 by a hard disk drive interface 32. As is apparent to those of ordinary skill in the art, the hard disk drive 27 accessible by the processing unit 21 may be considered components of the system memory 22. Alternatively or in addition, the computing device 12 may include flash memory connected to the system bus 23. The flash memory is accessible by the processing unit 21 may be considered a component of the system memory 22.

A number of program modules may be stored on the hard disk drive 27, the flash memory, ROM 24, and/or RAM 25, including the operating system 35, one or more application programs 36, other program modules 37, and program data 38. A user may enter commands and information into the computing device 12 through input devices such the input keys 220 of the user interface 200 (see FIGS. 2, 6, and 7). The computing device 12 may also send and/or receive commands and information via the ARINC 429 receivers and transmitters 622 and 624. These and other input devices are often connected to the processing unit 21 through a serial port interface 46 that is coupled to the system bus 23, but may be connected by other interfaces, such as a parallel port, game port, a universal serial bus (USB), a wireless interface (e.g., a Bluetooth interface), or any other type of suitable interface.

The computing device 12 may include one or more additional interface 40 configured to communicate with other devices, such as, referring to FIG. 7, the third (VDR) computer 643, the wireless (e.g., Bluetooth) data transmitter 712, the scanner 714, the automatic brightness control 716, the manual brightness control 718, or the like. Referring to FIG. 9, the interface(s) 40 may be coupled to the system bus 23. The interface(s) 40 may each be implemented as an serial port interface, a parallel port, game port, a USB connection, a wireless interface (e.g., a Bluetooth interface), or any other type of suitable interface.

The display 210 of the user interface 200 (see FIGS. 2, 6, and 7) may be connected to the system bus 23 via an interface, such as a video adapter 48. In addition to the display 210, the computing device 12 may include other peripheral output devices (not shown), such as speakers.

The computing device 12 may include an internal network interface 42 configured to communicate with the internal network 610, which is connected to the maintenance Ethernet connection 626 and the Ethernet interface 628. The computing device 12 may include a radio interface 53 configured to communicate with the VHF transceiver 630. Referring to FIG. 9, the internal network interface 42 and the radio interface 53 may be coupled to the system bus 23. The internal network interface 42 and the radio interface 53 may each be implemented as an serial port interface, a parallel port, game port, a USB connection, a wireless interface (e.g., a Bluetooth interface), or any other type of suitable interface.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

In some embodiments, the system memory 22 stores computer executable instructions (e.g., in the I/O software module 802, the ACARS module 804, the ATN module 806, the FANS 1/A ADS-C module 808, and the error correction module 810 illustrated in FIG. 8) that when executed by one or more processors cause the one or more processors to perform all or portions of one or more of the methods described above. Such instructions may be stored on one or more non-transitory computer-readable media. Generally, program modules (e.g., in the I/O software module 802, the ACARS module 804, the ATN module 806, the FANS 1/A ADS-C module 808, and the error correction module 810 illustrated in FIG. 8) include routines, programs, objects, components, data structures, etc., that perform particular tasks or implement particular abstract data types.

In some embodiments, the system memory 22 stores computer executable instructions that when executed by one or more processors cause the one or more processors to generate the screens (e.g., the top-level menu 300 illustrated in FIG. 3, the maintenance page 400 illustrated in FIG. 4, the data input screen 500 illustrated in FIG. 5 and the MCDU screen) described above. Such instructions may be stored on one or more non-transitory computer-readable media.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B, and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context.

Accordingly, the invention is not limited except as by the appended claims.

The invention claimed is:

1. An interface device configured to interface with one or more aircraft avionics data systems and an antenna, the interface device comprising:
   an enclosure;
   a very high frequency ("VHF") transceiver housed inside the enclosure and connected to the antenna, the VHF transceiver being configured to transmit outgoing messages and to receive incoming messages via the antenna; and
   at least one computing device housed inside the enclosure, the at least one computing device being configured to send the outgoing messages to the VHF transceiver for transmission by the VHF transceiver via the antenna and to receive the incoming messages from the VHF transceiver.

2. The interface device of claim 1 for use with the one or more aircraft avionics data systems being a Controller-Pilot Data Link Communications ("CPDLC") system, and an Aircraft Communications Addressing and Reporting System ("ACARS"), wherein the at least one computing device is configured to communicate with both the CPDLC system and the ACARS simultaneously.

3. The interface device of claim 1, wherein the VHF transceiver is configured to send and receive radio waves having a frequency from 118.0 MHz to 137.0 MHz.

4. The interface device of claim 1, further comprising:
   one or more aircraft interfaces connected to the at least one computing device, the one or more aircraft interfaces being configured to communicate with at least one aircraft system onboard an aircraft.

5. The interface device of claim 4, wherein the one or more aircraft interfaces comprise one or more ARINC 429 receivers and one or more ARINC 429 transmitters.

6. The interface device of claim 4, further comprising:
   an internal network housed inside the enclosure, the at least one computing device comprising first, second, and third computing devices, the internal network providing communication between the first, second, and third computing devices, the one or more aircraft interfaces comprising an interface with the internal network.

7. The interface device of claim 1, further comprising:
   a user interface connected to the at least one computing device, the user interface being configured to receive user input and send the user input to the at least one computing device, the at least one computing device being configured to include the user input in at least one of the outgoing messages sent to the VHF transceiver for transmission via the antenna.

8. The interface device of claim 1, wherein the at least one computing device comprises at least one processor connected to memory,
   the memory stores a Future Air Navigation Systems ("FANS") module, an Aeronautical Telecommunications Network ("ATN") module, and an Aircraft Communications Addressing and Reporting System ("ACARS") module,
   the FANS module stores FANS instructions that are executable by the at least one processor,
   the ATN module stores ATN instructions that are executable by the at least one processor,
   the ACARS module stores ACARS instructions that are executable by the at least one processor,
   when executed by the at least one processor, the FANS instructions cause the at least one processor to format the outgoing messages for a FANS and a Controller-Pilot Data Link Communications ("CPDLC") system, when executed by the at least one processor, the ATN instructions cause the at least one processor to format the outgoing messages for an ATN and the CPDLC system, and when executed by the at least one processor, the ACARS instructions cause the at least one processor to format the outgoing messages for an ACARS.

9. The interface device of claim 8, wherein when executed by the at least one processor, the FANS instructions cause the at least one processor to format the outgoing messages for an Automatic Dependent Surveillance-Contract ("ADS-C") system in addition to the FANS and the CPDLC system.

10. The interface device of claim 8, wherein when executed by the at least one processor, the ATN instructions cause the at least one processor to format the outgoing messages for transmission over a SATCOM network.

11. The interface device of claim 8, wherein when executed by the at least one processor, the ATN instructions cause the at least one processor to format the outgoing messages for transmission over a Very-High Frequency Digital Link ("VDL") network.

12. The interface device of claim 11, wherein the VDL network is a VDL Mode 2 network, a VDL Mode A network, or a VDL Mode 0 network.

13. The interface device of claim 8, wherein when executed by the at least one processor, the ACARS instructions cause the at least one processor to format the outgoing messages for transmission over a SATCOM network, a VDL Mode 2 network, a VDL Mode A network, or a VDL Mode 0 network.

14. The interface device of claim 1, wherein the at least one computing device comprises at least one processor connected to memory, the memory stores an error correction module comprising instructions that are executable by the at least one processor, and when executed by the at least one processor, the instructions cause the at least one processor to correct at least a portion of transmission errors in the incoming messages.

15. The interface device of claim 1, wherein the VHF transceiver is not configured to provide voice communication.

16. The interface device of claim 1, wherein the antenna is attached to an outside of the enclosure.

17. An interface device configured to interface with one or more remote aircraft avionics data systems, an antenna, and at least one aircraft system onboard an aircraft, the interface device comprising:

an enclosure;

a user interface configured to receive user input;

a first computing device housed inside the enclosure and connected to the user interface, the first computing device being configured to receive the user input from the user interface;

a radio housed inside the enclosure and connected to the antenna;

a third computing device housed inside the enclosure and connected to the radio, the third computing device being configured to send outgoing messages to the radio for transmission to the one or more remote aircraft avionics data systems via the antenna and to receive incoming messages from the one or more remote aircraft avionics data systems via the radio and the antenna;

one or more aircraft interfaces configured to communicate with the at least one aircraft system onboard the aircraft; and a second computing device housed inside the enclosure and connected to the one or more aircraft interfaces, the second computing device being configured to receive the user input from the first computing device, the second computing device being configured to send one or more first communications to the at least one aircraft system via the one or more aircraft interfaces based at least in part on a first portion of the user input, the second computing device being further configured to receive the incoming messages from the third computing device and send one or more second communications to the first computing device based at least in part on the incoming messages, the first computing device being configured to display one or more user messages on the user interface based at least in part on the one or more second communications.

18. The interface device of claim 17 for use with the one or more remote aircraft avionics data systems being a Controller-Pilot Data Link Communications ("CPDLC") system, and an Aircraft Communications Addressing and Reporting System ("ACARS"), wherein the second computing device is configured to communicate with both the CPDLC system and the ACARS simultaneously via the third computing device, the radio, and the antenna.

19. The interface device of claim 17, wherein the radio is a very high frequency ("VHF") transceiver.

20. The interface device of claim 19, wherein the VHF transceiver is configured to send and receive radio waves having a frequency from 118.0 MHz to 137.0 MHz.

21. The interface device of claim 17, further comprising:

the second computing device being further configured to send one or more third communications to the third computing device based at least in part on a second portion of the user input, the third computing device being configured to include the one or more third communications in at least one of the outgoing messages sent to the radio for transmission via the antenna.

22. The interface device of claim 21, wherein the second computing device comprises at least one processor connected to memory, the memory stores a Future Air Navigation Systems ("FANS") module, an Aeronautical Telecommunications Network ("ATN") module, and an Aircraft Communications Addressing and Reporting System ("ACARS") module, the FANS module stores FANS instructions that are executable by the at least one processor, the ATN module stores ATN instructions that are executable by the at least one processor, the ACARS module stores ACARS instructions that are executable by the at least one processor, when executed by the at least one processor, the FANS instructions cause the at least one processor to format the one or more third communications for a FANS and a Controller-Pilot Data Link Communications ("CPDLC") system, when executed by the at least one processor, the ATN instructions cause the at least one processor to format the one or more third communications for an ATN and the CPDLC system, and when executed by the at least one processor, the ACARS instructions cause the at least one processor to format the one or more third communications for an ACARS.

23. The interface device of claim 22, wherein when executed by the at least one processor, the FANS instructions cause the at least one processor to format the one or more third communications for an Automatic Dependent Surveillance-Contract ("ADS-C") system in addition to the FANS and the CPDLC system.

24. The interface device of claim 17, wherein the radio is not configured to provide voice communication.

* * * * *